(12) United States Patent
Lindoff et al.

(10) Patent No.: US 10,797,820 B2
(45) Date of Patent: Oct. 6, 2020

(54) METHOD AND A FIRST RADIO COMMUNICATION NODE FOR SCHEDULING A DATA TRANSMISSION

(75) Inventors: Bengt Lindoff, Bjärred (SE); Christian Bergljung, Lund (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1161 days.

(21) Appl. No.: 14/116,955

(22) PCT Filed: May 14, 2012

(86) PCT No.: PCT/SE2012/050505
§ 371 (c)(1),
(2), (4) Date: Dec. 19, 2013

(87) PCT Pub. No.: WO2012/158102
PCT Pub. Date: Nov. 22, 2012

(65) Prior Publication Data
US 2014/0105149 A1    Apr. 17, 2014

Related U.S. Application Data

(60) Provisional application No. 61/486,947, filed on May 17, 2011.

(30) Foreign Application Priority Data

May 17, 2011    (EP) .................................. 11166356

(51) Int. Cl.
*H04L 1/00*    (2006.01)
*H04L 1/18*    (2006.01)
(Continued)

(52) U.S. Cl.
CPC .......... *H04L 1/0003* (2013.01); *H04J 11/003* (2013.01); *H04L 1/0009* (2013.01);
(Continued)

(58) Field of Classification Search
CPC ....... H04L 1/00; H04L 1/0003; H04L 1/0009; H04L 1/0034; H04L 1/1867;
(Continued)

(56) References Cited

U.S. PATENT DOCUMENTS 7,593,363 B2 * 9/2009 Dottling ................ H04L 1/1671
370/328
2003/0108027 A1 * 6/2003 Kim ...................... H04L 1/1854
370/345
(Continued)

FOREIGN PATENT DOCUMENTS

CN    101594682 A    7/2011
EP    2101530 A1    9/2009
(Continued)

OTHER PUBLICATIONS

Zarei, S. et al. "LTE: Der Mobilfunk der Zukunft Channel Coding and Link Adaptation." Dec. 2009. pp. 2-6; Chapter 2. Available online at http://www.lmk.Int.de/fileadmin/Lehre/Seminar09/Ausarbeitungen/Ausarbeitung_Zarei.pdf.
(Continued)

*Primary Examiner* — Un C Cho
*Assistant Examiner* — Rasha K Fayed
(74) *Attorney, Agent, or Firm* — Murphy, Bilak & Homiller, PLLC

(57) ABSTRACT

A method in a first radio communication node (110, 310, 710, 1010) and a first radio communication node (110, 310, 710, 1010) for scheduling a data transmission in a first time frame using one of a plurality of modulation and coding schemes are provided. The data transmission is to be transmitted between the first radio communication node (110, 310, 710, 1010) and a second radio communication node (120, 320, 720, 1020). The first radio communication node (110, 310, 710, 1010) obtains (301, 701, 1001, 1401) a first
(Continued)

indication about channel quality for the first time frame. The first radio communication node (110, 310, 710, 1010) obtains (302, 702, 1002, 1402) second indication about a possible upcoming transmission failure. The possible upcoming transmission failure relates to a feedback information to be transmitted in a second time frame. The feedback information is associated with the data transmission in the first time frame. The first radio communication node (110, 310, 710, 1010) selects (303, 703, 1003, 1403) a modulation and coding scheme out of said plurality of modulation and coding schemes based on the first indication and the second indication. Next, the first radio communication node (110, 310, 710, 1010) schedules (304, 704, 1004, 1404) the data transmission using the selected modulation and coding scheme.

17 Claims, 12 Drawing Sheets

(51) Int. Cl.
  *H04J 11/00* (2006.01)
  *H04W 72/12* (2009.01)
  *H04W 24/10* (2009.01)
(52) U.S. Cl.
  CPC .......... *H04L 1/0034* (2013.01); *H04L 1/1867* (2013.01); *H04W 72/12* (2013.01); *H04W 72/1226* (2013.01); *H04W 24/10* (2013.01); *H04W 72/1215* (2013.01)
(58) Field of Classification Search
  CPC . H04L 1/0002; H04L 1/18; H04L 1/08; H04L 1/1896; H04L 1/1812; H04L 1/1819; H04L 1/1887; H04L 1/0017; H04L 27/2647; H04L 27/2626; H04L 25/0202; H04L 5/0007; H04L 12/56; H04L 47/6225; H04L 47/14; H04L 47/26; H04W 72/12; H04W 72/1215; H04W 72/1226; H04W 72/08; H04W 72/1284; H04W 72/1231; H04W 24/10; H04W 52/04; H04W 52/44; H04W 52/48; H04W 76/04; H04B 7/26; H04B 7/216
  USPC ........................................ 370/329, 437, 335
  See application file for complete search history.

(56) References Cited

U.S. PATENT DOCUMENTS

| | | | |
|---|---|---|---|
| 2003/0210668 A1* | 11/2003 | Malladi | H04L 1/0015 370/335 |
| 2006/0146762 A1* | 7/2006 | Kuroda | H04L 1/0017 370/335 |
| 2006/0227800 A1* | 10/2006 | Hosein | H04L 47/26 370/437 |
| 2007/0298822 A1* | 12/2007 | Wan | H04L 1/20 455/509 |
| 2010/0034176 A1* | 2/2010 | Heo | H04L 1/0027 370/335 |
| 2010/0085931 A1* | 4/2010 | Suk | H04L 1/0029 370/329 |
| 2010/0091725 A1* | 4/2010 | Ishii | H04W 72/04 370/329 |
| 2010/0110901 A1* | 5/2010 | Wong | H04B 17/336 370/242 |
| 2010/0192035 A1* | 7/2010 | Sagfors | H04L 1/1819 714/748 |
| 2011/0142143 A1* | 6/2011 | Wu | H04L 27/3488 375/259 |
| 2011/0249656 A1* | 10/2011 | Cai | H04W 52/325 370/336 |
| 2012/0120839 A1* | 5/2012 | Liu | H04W 24/00 370/252 |

FOREIGN PATENT DOCUMENTS

| | | |
|---|---|---|
| EP | 2 410 666 A1 | 1/2012 |
| WO | 2009140926 A1 | 11/2009 |
| WO | 2009157729 A1 | 12/2009 |
| WO | 2010105503 A1 | 9/2010 |
| WO | 2010127624 A1 | 11/2010 |

OTHER PUBLICATIONS

Unknown, Author. "Text Proposal on Link Adaptation in E-UTRA Uplink." NTT DoCoMo, Fujitsu, NEC, Sharp. R1-060049. 3GPP TSG-RAN WG1 LTE Ad Hoc Meeting. Jan. 23-25, 2006. Helsinki, Finland.
Unknown, Author. "Consideration on TDD Relay Frame Structure." CATT. R1-101555. 3GPP TSG RAN WG1 meeting #60. Feb. 22-26, 2010. San Francisco, USA.
Unknown, Author. "Interaction of Compressed Mode with HSDPA." Siemens. R1-02-0279. TSG-RAN Working Group 1 #24. Feb. 18-22, 2002. Orlando, Florida.
Unknown, Author. "Compressed Mode Interactions." NEC. R2-050219. TSG-RAN Working Group2#45bis. Jan. 10-14, 2005. Sophia Antipolis, France.

* cited by examiner

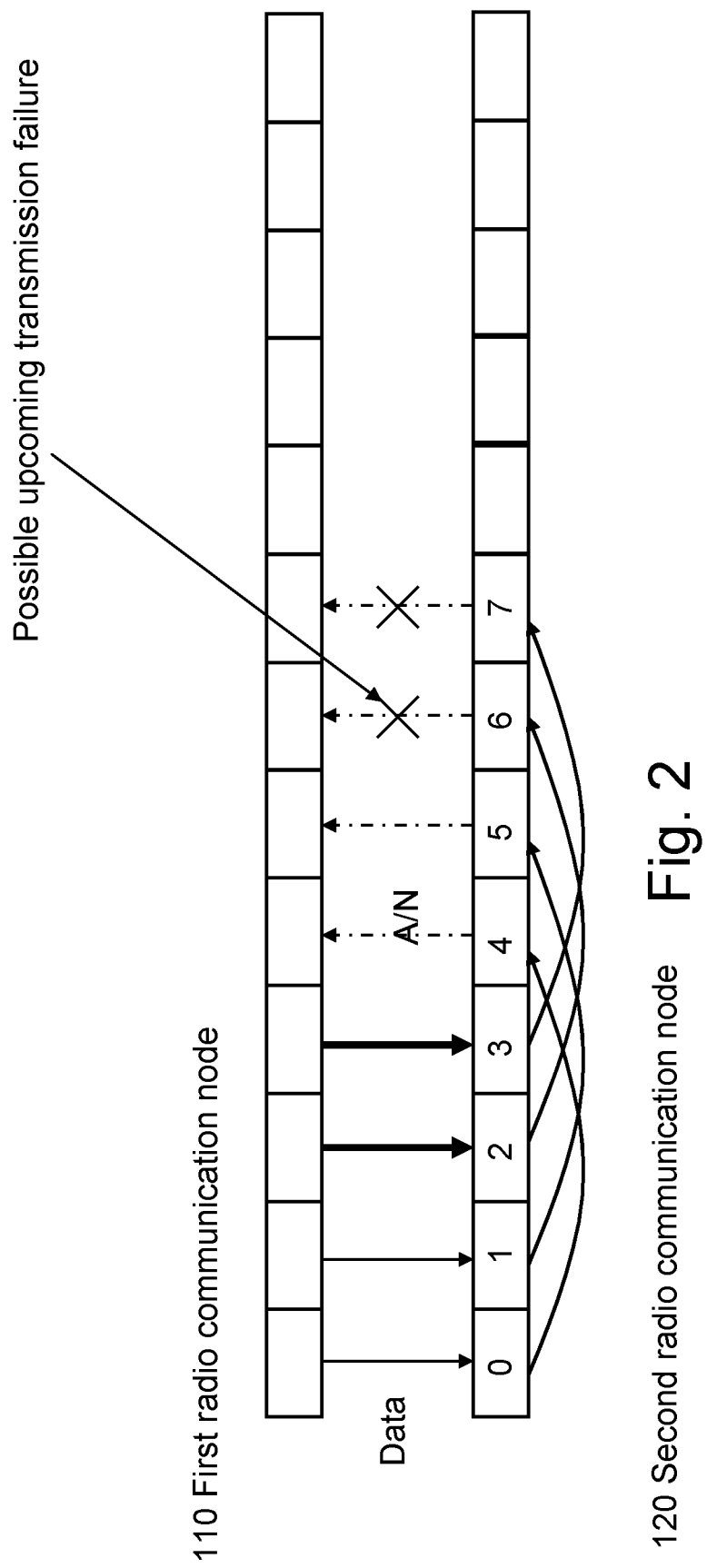

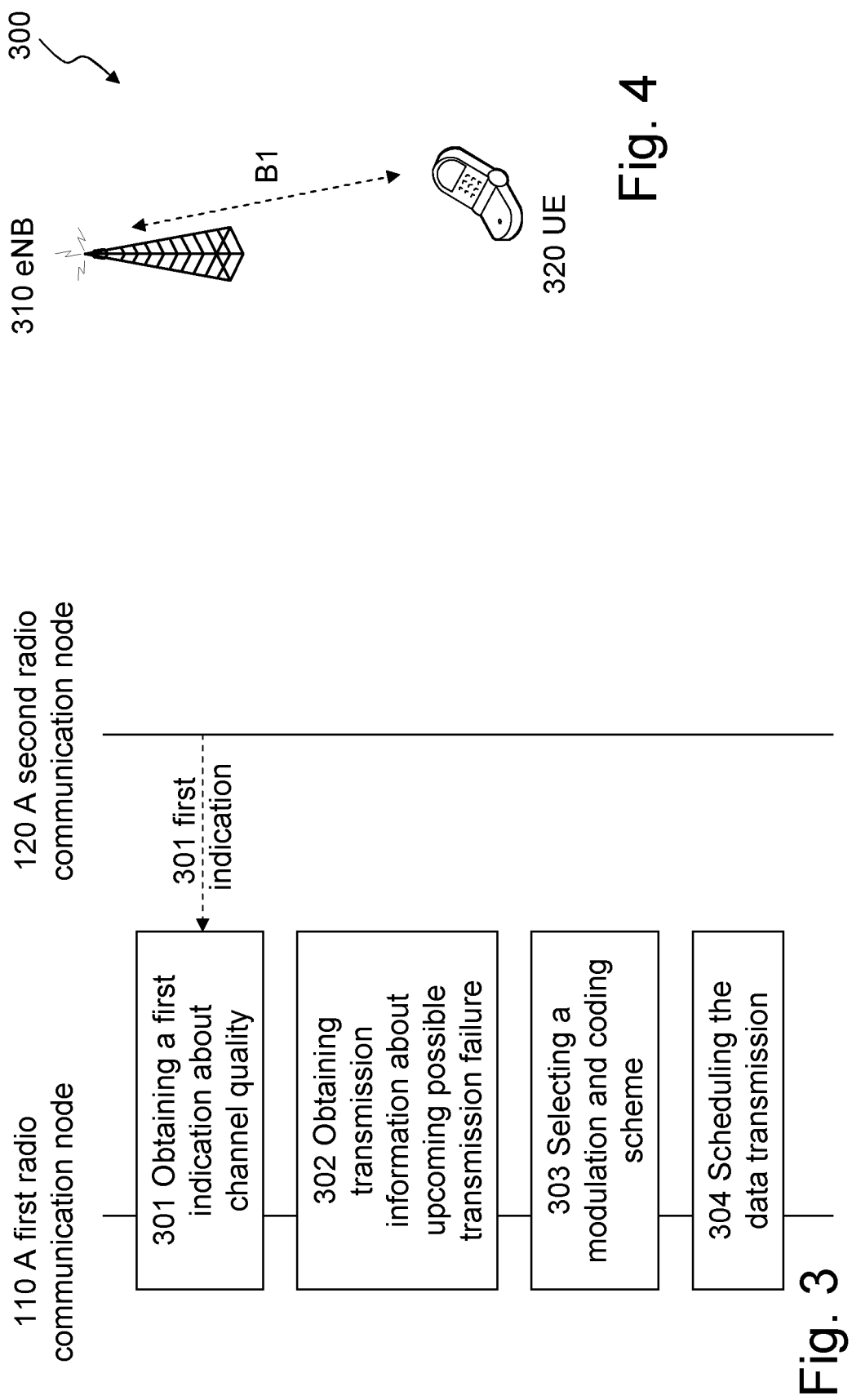

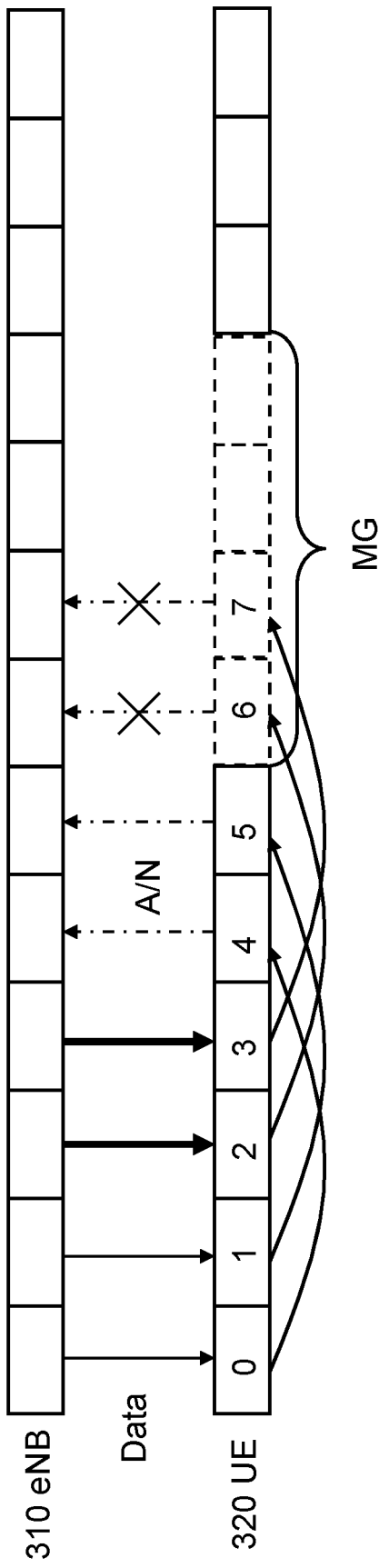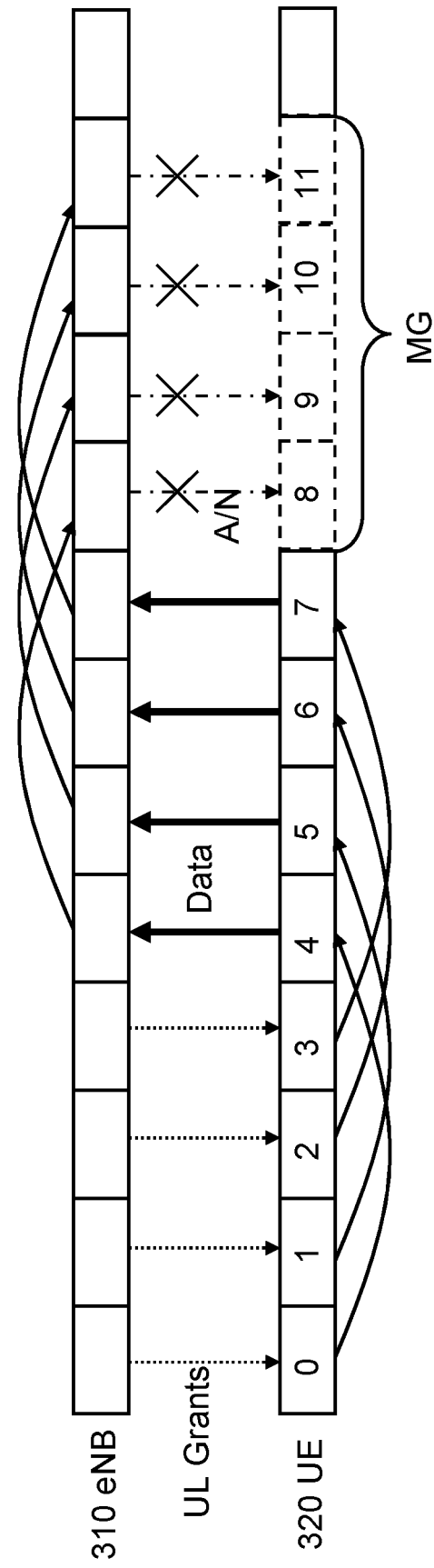

METHOD AND A FIRST RADIO COMMUNICATION NODE FOR SCHEDULING A DATA TRANSMISSION

TECHNICAL FIELD

The present disclosure relates to the field of telecommunication. In particular, the present disclosure relates to a method in a first radio communication node and a first radio communication node for scheduling a data transmission in a first frame using one of a plurality of modulation and coding schemes.

BACKGROUND

High throughput rates in cellular radio communication systems of today are important for users of the cellular radio communication systems. It is common that throughputs of 100 Mbits/s and higher are required.

A Long Term Evolution (LTE) system includes different protocol layers, such as a physical layer, often referred to as L1, and higher layers, often referred to as L2, L3 etc. Throughput requirements of 100 Mbits/s, and higher, require the physical layer, L1, to have a very short round trip time in order to not stall protocols running at higher layers, such as Transmission Control Protocol (TCP). A protocol at higher layers may be stalled when transmission in lower layers fails to deliver correct data within a certain time frame.

In order provide short round trip times, Hybrid Automatic Repeat reQuest (HARQ) is used in LTE.

HARQ means that an Acknowledgment/Negative Acknowledgement (ACK/NACK) feedback response, or feedback information response, is sent, or fed back, in response to reception of an L1 data packet. As an example, a first radio communication unit sends the L1 data packet to a second radio communication unit. Next, the second radio communication unit sends a feedback information response in order to confirm, i.e. by sending ACK, or not confirm, i.e. by sending NACK, proper reception of the L1 data packet. The L1 data packet is a data packet transmitted on the physical (L1) layer channels. In case the feedback response indicates a NACK, the L1 data packet is retransmitted. In case the feedback response indicates an ACK, a subsequent L1 data packet in a list of L1 data packets is transmitted. The list of L1 data packets comprises data packets which are to be sent to the second radio communication unit. The feedback response time in LTE is 4 ms. Thus, if a packet is transmitted from the first radio communication unit to the second radio communication unit at time t, the second radio communication unit shall transmit a feedback response, comprising an ACK/NACK, at t+4 ms to the transmitter.

Moreover, so called link adaptation has been employed in LTE in order to provide efficient use of the radio channel. Link adaptation means that the link quality, or channel quality information, is measured by the receiver and a CQI (Channel Quality Index/Indicator) is fed back to the transmitter. Modulation and Coding Schemes (MCS) are chosen, typically by a radio base station, such that sufficient link quality is obtained. Sufficient link quality may be that a certain Block Error Rate (BLER) for a data transmission is obtained. Typically the certain BLER is 10-30%, which for many cases is considered to be acceptable. In case of erroneous transmission of the data transmission, it may be required that the data transmission is retransmitted.

In some scenarios the feedback response may be unreliable or not even present. For instance when a terminal is at a coverage border of a radio base station, the terminal requests to be allocated measurement gaps for Inter Radio Access Technology/Inter Frequency (IRAT/IF) measurements. In LTE, the radio base station may allocate measurement gaps of 6 ms at every 40/80 ms to the terminal. In this case, a terminal cannot transmit or receive data during the measurement gaps.

In other scenarios, involving relay nodes, unreliable feedback response may also occur. A relay node behaves more or less like a terminal or user equipment (UE) from a network node perspective. Furthermore, the relay node behaves more or less like a radio network node from a terminal perspective. In current LTE standardization of relay nodes, it is assumed that a transmission of data from the radio network node, or node B, to the relay node is allowed in a subset of all subframes. The subset of all subframes may be so called Multi-Media Broadcast over a Single Frequency Network (MBSFN) subframes. These MBSFN subframes are in this scenario used for a different purpose than initially intended. However, a transmission from the relay node to a terminal is not specified by the standard. In case the relay node transmits a first transmission to the radio network node and at the same time receives a second transmission from the terminal on one carrier frequency, i.e. the sending of the first transmission and receiving of the second transmission is on the same carrier frequency, there is a large risk of self interference. Self interference means that the reception of the second transmission is interfered by the sending of the first transmission. In case the second transmission is a feedback response, a problem may be that the detection of the feedback response may be unreliable. Self interference can occur not only when the same carrier frequency is used, but also in case the frequencies used between the radio network node and the relay node and the frequency used between the relay node and the UE are sufficiently close, for example in the same frequency band, and so that there will be no band selective filter that will reduce the self interference.

In scenarios where a radio communication system, comprising a terminal and a radio base station, utilizes discontinuous transmission (DTX), it has been suggested to improve detection of the feedback response by allowing the radio base station to utilize information about a DTX cycle of the discontinuous transmission. The DTX cycle may comprise a transmission period, during which transmission may occur, and a sleep period during which transmission may not occur. In case a feedback response detector, comprised in the radio base station, detects that an ACK/NACK pertaining to a transmission is to be received during the sleep period, a scheduler, also comprised in the radio base station, assumes that the transmission was not received at an intended recipient node. Hence, the scheduler reschedules the transmission, whereby the transmission will be retransmitted. In case the terminal actually received the transmission, but the feedback response was not received by the terminal due to the sleep period, the retransmission introduces increased interference and lower total system throughput.

In order to alleviate problems with unreliable feedback response in conjunction with measurement gaps, it has been proposed to stop data transmission prior to the measurement gap. In this manner, it may be assured that transmission of feedback response, such as ACK/NACKs, does not occur within the measurement gap. In case of a LTE system, this effectively prolongs the measurement gap to 10 ms, i.e. 4 ms for the response time added to 6 ms for the duration of the measurement gap. These 10 ms are to be compared with the frequency at which the measurement gaps occur, i.e. every 40 or 80 ms. As a consequence up to 25% of the frames may not be available for data transmission. A disadvantage is, hence, that throughput is decreased.

Measurement gaps are also used in Wideband Code Division Multiple Access (WCDMA) systems. In order to overcome problems related to measurement gaps in WCDMA systems, a so called compressed mode may be employed. In WCDMA, a measurement gap is generated for example 7 out of 15 slots in a frame. In order to be able to transmit the same amount of data during 7 instead of 15 slots, higher power is used since the same energy per received information bit needs to be maintained to ensure similar link quality. However, a drawback of the higher power is that interference towards other users in the system may be increased.

SUMMARY

It is therefore an object of embodiments herein to provide a way of improving performance of a cellular radio communication system.

According to one aspect, the object is achieved by a method in a first radio communication node, such as a radio base station or an eNB, for scheduling a data transmission in a first time frame using one of a plurality of modulation and coding schemes. The data transmission is to be transmitted between the first radio communication node, such as an eNB, and a second radio communication node, such as a user equipment. The first radio communication node and the second radio communication node are comprised in a radio communication system. The first radio communication node obtains a first indication about channel quality for the first time frame. The first radio communication node also obtains a second indication about a possible upcoming transmission failure in a second time frame. The possible upcoming transmission failure relates to a feedback information to be transmitted in the second time frame. The feedback information is associated with the data transmission in the first time frame. The first radio communication node selects a modulation and coding scheme out of said plurality of modulation and coding schemes based on the first indication and the second indication. The first radio communication node schedules, in the first time frame, the data transmission using the modulation and coding scheme.

According to another aspect, the object is achieved by a first radio communication node for scheduling a data transmission in a first time frame using one of a plurality of modulation and coding schemes. The data transmission is to be transmitted between the first radio communication node and a second radio communication node. The first and second radio communication nodes are comprised in a radio communication system. The first radio communication node comprises a processing circuit configured to obtain a first indication about channel quality for the first time frame. The processing circuit is further configured to obtain a second indication about a possible upcoming transmission failure in a second time frame. The first and second time frames may be sub-frames, time slots, slots, time periods or the like. The possible upcoming transmission failure relates to a feedback information, which is associated with the data transmission in the first time frame, to be transmitted in the second time frame. The feedback information may be ACK/NACK reports or the like, indicating the success or failure of the data transmission in the first time frame. Moreover, the processing circuit is configured to select a modulation and coding scheme out of said plurality of modulation and coding schemes based on the first indication and the second indication. In addition, the processing circuit is configured to schedule, in the first time frame, the data transmission using the modulation and coding scheme.

The first indication about channel quality in the first time frame may be Channel Quality Index (CQI), signal-to-interference-ratio (SIR), signal-to-noise-ratio (SNR), signal-to-interference-and-noise-ratio (SINR) or the like.

The second indication about the possible upcoming transmission failure in the second time frame may be related to transmission from the first radio communication node or reception by the first radio communication node, i.e. in some examples it may relate to uplink transmissions and in some other examples it may relate to downlink transmissions.

The second indication may be CQI, SIR, SNR, SINR or the like. Alternatively or additionally, the second indication may comprise information about measurement gaps and/or an upcoming collision between transmission of the feedback information and a further data transmission as is will be explained herein.

As an example, the radio communication system may be a Long Term Evolution (LTE) system, a Bluetooth system, a Wireless Local Area Network system or the like.

Since the first radio communication node obtains the second indication about a possible upcoming transmission failure of the feedback information in the second frame, it is made possible for the first radio communication node to schedule the data transmission based on the first indication for the first time frame and the second indication for the second time frame. Hence, according to some examples, when it is predicted that the feedback information in the second time frame may be unreliable, the scheduling of the data transmission in the first time frame is adapted such that it may be assumed that the data transmission may have been properly received as intended. As a consequence thereof, the feedback information, or feedback for short, is not required to be transmitted and received in order to confirm proper transmission and reception of the data transmission. Moreover, retransmission of the data transmission is not performed, which for example is the case when a NACK has been assumed, while the data transmission nevertheless was properly received. As a result, also time frames for which the feedback information is predicted to be unreliable may be used for transmission of data without requiring transmission of feedback information. Thus, performance, such as data rate, of the radio communication system, may be improved.

In some examples, the feedback information may be considered to be unreliable when SNR, SIR or SINR for the second time frame is less than a channel quality threshold value.

In some examples, the feedback information may be considered to be unreliable when a measurement gap coincides with the second time frame for transmission of the feedback information.

In some examples, the feedback information may be considered to be unreliable when a further data transmission occurs in the second time frame for transmission of the feedback information.

An advantage of embodiments of the invention may be that when unreliable feedback information may be expected, the feedback information may be omitted without unnecessarily compromising performance of the cellular radio communication system.

In some embodiments of the method, the second radio communication node is a user equipment. The obtaining of the first indication about channel quality comprises receiving the first indication from the user equipment. The first indication comprises a channel quality index, CQI, information or a signal-to-interference-ratio, SIR, information.

In some embodiments of the method, the selecting comprises selecting, if the second indication is below a channel quality threshold value, the modulation and coding scheme to target a first block-error-rate, BLER, for the data transmission, or selecting, if the second indication is above the channel quality threshold value, the modulation and coding scheme to target a second block-error-rate, BLER, for the data transmission. The first BLER is smaller than the second BLER. As an example, the first BLER is less than 0.5% or less than 0.1% and the second BLER is less than 10-30%.

In some embodiments of the method, the obtaining of the second indication about a possible upcoming transmission failure is further performed by predicting that the second time frame for transmission of the feedback information occurs during a measurement gap period. The user equipment is capable of measuring channel quality towards neighbouring radio network nodes during the measurement gap period. The neighbouring radio network nodes are neighbours to the first radio communication node.

In some embodiments of the method, the selecting comprises if the first communication node predicts that the second time frame for transmission of the feedback information occurs during a measurement gap period then selecting the modulation and coding scheme to target a first block-error-rate, BLER, for the data transmission, or else selecting the modulation and coding scheme to target a second block-error-rate, BLER, for the data transmission. The first BLER is smaller than the second BLER. Hence, the second indication may be set by the first communication node to a value less than the channel quality threshold if the first communication node predicts that the second time frame for transmission of the feedback information occurs during a measurement gap period.

In some embodiments of the method, the obtaining of the second indication about transmission conditions is further performed by predicting that the second time frame for transmission of the feedback information occurs during transmission of a further data transmission to a third radio communication node. The further data transmission may also occur during the second time frame.

In some embodiments of the method, the selecting comprises if the first communication node predicts that the second time frame for transmission of the feedback information occurs during transmission of a further data transmission to the third radio communication node then selecting the modulation and coding scheme to target a first block-error-rate, BLER, for the data transmission, or else selecting the modulation and coding scheme to target a second block-error-rate, BLER, for the data transmission. The first BLER is smaller than the second BLER. Hence, the second indication may be set, by the first communication node, to a value less than the channel quality threshold if the first communication node predicts that the second time frame for transmission of the feedback information occurs during transmission of a further data transmission to the third radio communication node.

In some embodiments of the method, the first radio communication node is a relay node, the second radio communication node is a user equipment, the third radio communication node is a radio network node comprised in the radio communication system. The feedback information is to be transmitted by the user equipment.

In some embodiments of the method, the feedback information is to be sent by the second radio communication node, such as a headset using Bluetooth, a Wireless Local Area Network (WLAN) router or the like. In this embodiment, the first radio communication node may be a user equipment and the third radio communication node may be a radio network node, such as an eNB. The third radio communication node is capable of communicating with the user equipment using a different radio communication technology, such as LTE, than the radio communication technology used by the radio communication system, which may be a Bluetooth system, a WLAN system or the like.

In some embodiments of the first radio communication node, the first radio communication node comprises a receiver configured to receive the first indication from the user equipment. The first indication may comprise a channel quality index, CQI, information, or a signal-to-interference-ratio, SIR, information. In this embodiment, the second radio communication node may be a user equipment.

In some embodiments of the first radio communication node, a first block-error-rate, BLER, is smaller than a second block-error-rate, BLER, and the processing circuit (1610) is configured to select, if the second indication is below a channel quality threshold value, the modulation and coding scheme to target the first BLER for the data transmission, or to select, if the second indication is above the channel quality threshold value, the modulation and coding scheme to target the second BLER for the data transmission.

The modulation and coding scheme which is selected when the second indication is below the channel quality threshold value is more robust than the modulation and coding scheme selected when the second indication is above the channel quality threshold value.

In some embodiments of the first radio communication node, the processing circuit is configured to predict when the second time frame for transmission of the feedback information occurs during a measurement gap period. The user equipment is capable of measuring channel quality towards neighbouring radio network nodes during the measurement gap period. The neighbouring radio network nodes are neighbours to the first radio communication node. The processing circuit is further configured to perform the selection of the modulation and coding scheme when the transmission of the feedback information occurs during the measurement gap period.

In some embodiments of the first radio communication node, the processing circuit is configured to predict that the second time frame for transmission of the feedback information occurs during transmission of a further data transmission to a third radio communication node. Moreover, the processing circuit is configured to perform the selection of the modulation and coding scheme when the transmission of the feedback information is predicted to occur during the transmission of the further data transmission.

In some embodiments of the first radio communication node, the first radio communication node is a relay node, the second radio communication node is a user equipment, the third radio communication node is a radio network node, which are comprised in the radio communication system. The user equipment is configured to send the feedback information.

In some embodiments of the first radio communication node, the first radio communication node is a user equipment. The third radio communication node is a radio network node. The second radio communication node is configured to send the feedback information. The third radio communication node is configured for communicating with the user equipment using a different radio communication technology than the radio communication technology used by the radio communication system.

BRIEF DESCRIPTION OF THE DRAWINGS

The various aspects of embodiments disclosed herein, including particular features and advantages thereof, will be readily understood from the following detailed description and the accompanying drawings, in which:

FIG. 2 shows a scenario, in which feedback information that is unreliable is indicated, FIG. 3 shows a schematic, combined signalling and flow chart of exemplifying methods in the radio communication system according to FIG. 1, FIG. 4 shows a schematic overview of another exemplifying radio communication system, FIG. 5 shows a downlink scenario, in which feedback information that is unreliable is indicated, FIG. 6 shows an uplink scenario, in which feedback information that is unreliable is indicated.

DETAILED DESCRIPTION

Figure 1:
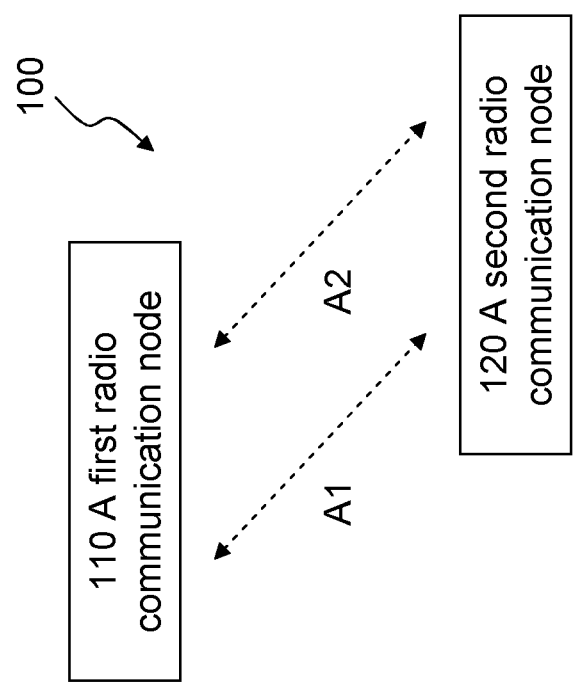
FIG. 1 shows a schematic overview of an exemplifying radio communication system in which exemplifying methods according embodiments herein may be implemented.

Throughout the following description similar reference numerals have been used to denote similar elements, network nodes, parts, items or features, when applicable. In the Figures, features that appear in some embodiments are indicated by dashed lines.

With reference to FIG. 1, there is shown a schematic overview of an exemplifying radio communication system 100 in which exemplifying methods according embodiments herein may be implemented. The radio communication system 100 is a Long Term Evolution (LTE) system. Moreover, the radio communication system 100 comprises a first radio communication node 110, such as an eNB, and a second radio communication node 120, such as a user equipment (UE).

A first communication arrow A1 and a second communication arrow A2 indicate that the first radio communication node 110 and the second radio communication node 120 are configured to be able to communicate with each other. The first communication arrow A1 denotes communication, such as a transmission, in a first time frame and the second communication arrow A2 denotes communication, such as a transmission, in a second time frame.

As used herein, the expression "user equipment" may denote a mobile phone, a cellular phone, a Personal Digital Assistant (PDA) equipped with radio communication capabilities, a smart phone, a laptop equipped with an internal or external mobile broadband modem, a portable electronic radio communication device or the like.

It shall be understood that the present disclosure may also be applied to radio communication systems other than LTE systems. Hence, in other example, the radio communication system may be a WCDMA system, High Speed Packet Access (HSPA) system, which is an extension of WCDMA, or the like.

With reference to FIG. 2, a schematic overview of time frames in a radio communication between the first radio communication node 110 and the second radio communication node 120 of FIG. 1 is shown. In FIG. 2, there is shown a plurality of time frames 0-7, such as sub-frames 0-7, for the radio communication between the first radio communication node 110 and the second radio communication node 120. Solid arrows denote data sent from the first radio communication node 110 and received by the second radio communication node 120. The solid arrows may correspond to the first communication arrow A1 in FIG. 1. Dash-dotted arrows denote feedback information, such as ACK/NACK, sent from the second radio communication node 120 and received by the first radio communication node 110. The ACK/NACKs are denoted A/N in FIG. 2. Two dash-dotted arrows, corresponding to time frames 6 and 7, are crossed over, to indicate that feedback information is unreliable. These may correspond to the second communication arrow A2 in FIG. 1. The feedback information may be considered to be, or predicted to be, unreliable for different reasons as exemplified in the following.

Two thick, solid arrows denote data transmissions in time frames 2 and 3. These data transmissions cause the feedback information sent in time frames 6 and 7.

In the scenario of FIG. 2, a problem may be that the first radio communication node 110 cannot receive the feedback information in time frames 6 and 7 since the feedback information is unreliable. This will lead to performance degradation of the radio communication system.

To overcome, or at least reduce, the above mentioned problem, a general solution is presented in FIG. 3. Briefly, the first radio network node 110 selects a modulation and coding scheme for a data transmission in a first time frame based on both a first indication about channel quality in the first time frame and second indication about an upcoming possible transmission failure of the feedback information in a second time frame.

With reference to FIG. 3, a combined signalling and flow chart is shown of exemplifying methods according to embodiments presented herein. In this example, the first radio communication node 110 performs a method for scheduling a data transmission in a first time frame using one of a plurality of modulation and coding schemes. The data transmission is to be transmitted between the first radio communication node 110 and the second radio communication node 120. As mentioned above, the first radio communication node 110 and the second radio communication node 120 are comprised in the radio communication system 100.

With reference to FIG. 3, the following actions, or steps, may be performed in accordance with the embodiments of the invention. Notably, in some embodiments of the method the order of the actions may differ from what is indicated below. Specifically, any order of obtaining the first indication for the first time frame and the second indication for the second time frame should be considered part of the present description.

Action 301

The first radio communication node 110 obtains a first indication about channel quality for the first time frame, such as sub-frame denoted 2 or 3 in FIG. 2.

The first indication, is obtained by being received from the user equipment 120, may comprise one or more of channel quality index/indication (CQI), signal-to-interference-and-noise-ratio (SINR), signal-to-noise-ratio (SNR), signal-to-interference-ratio (SIR) and the like. Alternatively or additionally, the first radio communication node 110 obtains the first indication by estimation.

Action 302

The first radio communication node 110 obtains a second indication about a possible upcoming transmission failure. The possible upcoming transmission failure relates to a feedback information to be transmitted in a second time frame, such as sub-frame denoted 6 or 7 in FIG. 2. The feedback information is associated with the data transmission in the first time frame. Expressed differently, the first radio communication node 110 obtains a second indication about channel quality for a second time frame for transmission of a feedback information associated with the data transmission in the first time frame.

As an example, the second indication may indicate the cause of the upcoming transmission failure. The upcoming failure may be caused by for instance a measurement gap preventing the transmission of the feedback information in the second time frame, see FIG. 7, or a collision between a further transmission and the transmission of the feedback information in the second time frame, see FIG. 10 and FIG. 14. In some examples, the feedback information is to be received by the first radio communication node 110 and in some examples, the feedback information is to be sent by the first radio communication node 110.

It may here be noted that the feedback information may relate to an uplink or a downlink transmission of the data transmission. In case of an uplink transmission, the feedback information is to be sent by the first radio communication node 110 and is to be received by the second radio communication node 120. In case of a downlink transmission, the feedback information response is to be sent by the second radio communication node 120 and is to be received by the first radio communication node 110.

Action 303

The first radio communication node 110 selects a modulation and coding scheme out of said plurality of modulation and coding schemes based on the first indication for the first time frame and the second indication for the second time frame.

The selecting of the modulation and coding scheme may be based on the second indication in that if the second indication indicates that the feedback information is predicted to be unreliable then a more robust modulation and coding scheme is selected. The more robust modulation and coding scheme may for example have a decreased code rate and/or a less constellation points in the modulation format (such as 64-QAM modulation with Code Rate 0.45 is more robust than 64-QAM modulation with code rate 0.75 and 16-QAM modulation is more robust than 64-QAM modulation for the same code rate). The more robust modulation and coding scheme is more robust than another modulation and coding scheme. The more robust modulation and coding scheme may be referred to as a first modulation and coding scheme. Said another modulation and coding scheme may be referred to as a second modulation and coding scheme. If the second indication indicates that the feedback information is predicted to be unreliable, the second modulation and coding scheme may, according to some embodiments, be used to obtain the first modulation and coding scheme as is explained with reference to FIG. 15.

In some examples, the feedback information may be considered to be unreliable when a measurement gap coincides with the second time frame for transmission of the feedback information. See for example FIGS. 5 and 6.

In some examples, the feedback information may be considered to be unreliable when a further data transmission occurs in the second time frame for transmission of the feedback information. See for example FIGS. 9, 12 and 13.

In some examples, the feedback information may be considered to be unreliable when SNR, SIR or SINR for the second time frame is less than the channel quality threshold value.

In the examples, where the feedback information is unreliable due to a measurement gap, the signal may be zero. This means that SNR, SIR, SINR will be zero, or small, as well. When at least one of SNR, SIR, SINR is small, at least one of SNR, SIR, SINR is likely to be less the channel quality threshold value. In some embodiments, the second indication may be set to zero, or any other value being less than the channel quality threshold value, when the measurement gap occurs in the second time frame for transmission of the feedback information. Expressed differently, the measurement gap coincides in time with the second time frame.

In the examples, where the feedback information is unreliable due to that it coincides in time with a further data transmission, interference and/or noise may be high. This means that SNR, SIR and/or SINR are small. When at least one of SNR, SIR, SINR is small, at least one SNR, SIR, SINR is likely to be less the channel quality threshold value. In some embodiments, the second indication may be set to zero, or any other values being less than the channel quality threshold value, when the data transmission occurs in the second time frame.

In some embodiments, the modulation and coding scheme, selected when the second indication is below the channel quality threshold value, is chosen such that the targeted performance, e.g. BLER, is at certain level, whereas the modulation and coding scheme, selected when the second indication is above the channel quality threshold value, is chosen such that the targeted performance, e.g. BLER, is at another certain level, and where the performance in the former case is better than in the latter case. For instance, in case the performance is BLER, the BLER in the former case is smaller than the BLER in the latter case.

Action 304

The first radio communication node 110 schedules, in the first time frame, the data transmission using the modulation and coding scheme that was selected in Action 303.

In the following a first, a second, and a third exemplifying scenario will be described with reference to the radio communication systems shown in FIGS. 4, 8 and 11, respectively. For each of the scenarios, problems or drawbacks will be briefly noted and then exemplifying methods, overcoming or at least reducing the problems and drawbacks, will be presented.

Referring to FIG. 4, an exemplifying radio communication system 300 relating to the first exemplifying scenario is shown. It may be noted that the first exemplifying scenario is herein below elaborated to describe a downlink and an uplink scenario. The radio communication system 300 is a LTE system. The radio communication system 300 comprises an eNB 310 and a user equipment 320. A dashed-line B1, provided with an arrow at each end, indicates that the eNB and the user equipment are configured to be able to communicate with each other. In this example, the eNB 310 is an example of the first radio communication node and the user equipment 320 is an example of the second radio communication node.

Now with reference to FIG. 5, a downlink scenario relating to the radio communication system 300 of FIG. 4 will be described. A plurality of time frames, such as sub-frames as are known from 3GPP terminology, is shown. Solid arrows, thin as well as thick arrows, denote downlink data transmissions for which feedback information is required to be sent to the eNB 310. In this example, two downlink data transmissions, shown as thin, solid arrows, cause two ACK/NACKs, or A/N, to be transmitted from the user equipment 320 to the eNB 310. However, a problem may be that for the following two downlink data transmissions, shown as thick, solid arrows, two ACK/NACKs corresponding thereto may not be transmitted from the user equipment 320 to the eNB 310, because a measurement gap MG prevents the user equipment 320 from transmitting ACK/NACK to the eNB 310. The two ACK/NACKs, corresponding to the two downlink data transmissions indicated by thick, solid arrows, are shown as crossed over dash-dotted arrows. Due to that the measurement gap MG prevents the user equipment 320 from transmitting the ACK/NACKs to the eNB 310, performance of the radio communication system 300 may degrade.

Similarly, for an uplink scenario, shown in FIG. 6, it may not be possible to transmit some ACK/NACKs as described in the following. In FIG. 6, thin, solid arrows denoted uplink grants sent by the eNB 310 to the user equipment 320 and thick, solid arrows denote uplink data transmissions corresponding to the uplink grants. As is known in the art, an uplink grant includes information about modulation and coding scheme as well as information about resource allocation to be applied by the user equipment in the uplink data transmissions. In this scenario, the eNB 310 is required to send ACK/NACKs to the user equipment 320 for each of the uplink data transmissions. Similarly to the scenario of FIG. 5, a drawback may be that some ACK/NACKs may not be received by the user equipment 320, because a measurement gap MG prevents the user equipment 320 from receiving ACK/NACK from the eNB 310. Again, this may lead to degraded performance of the radio communication system 300.

Figures 7, 8:
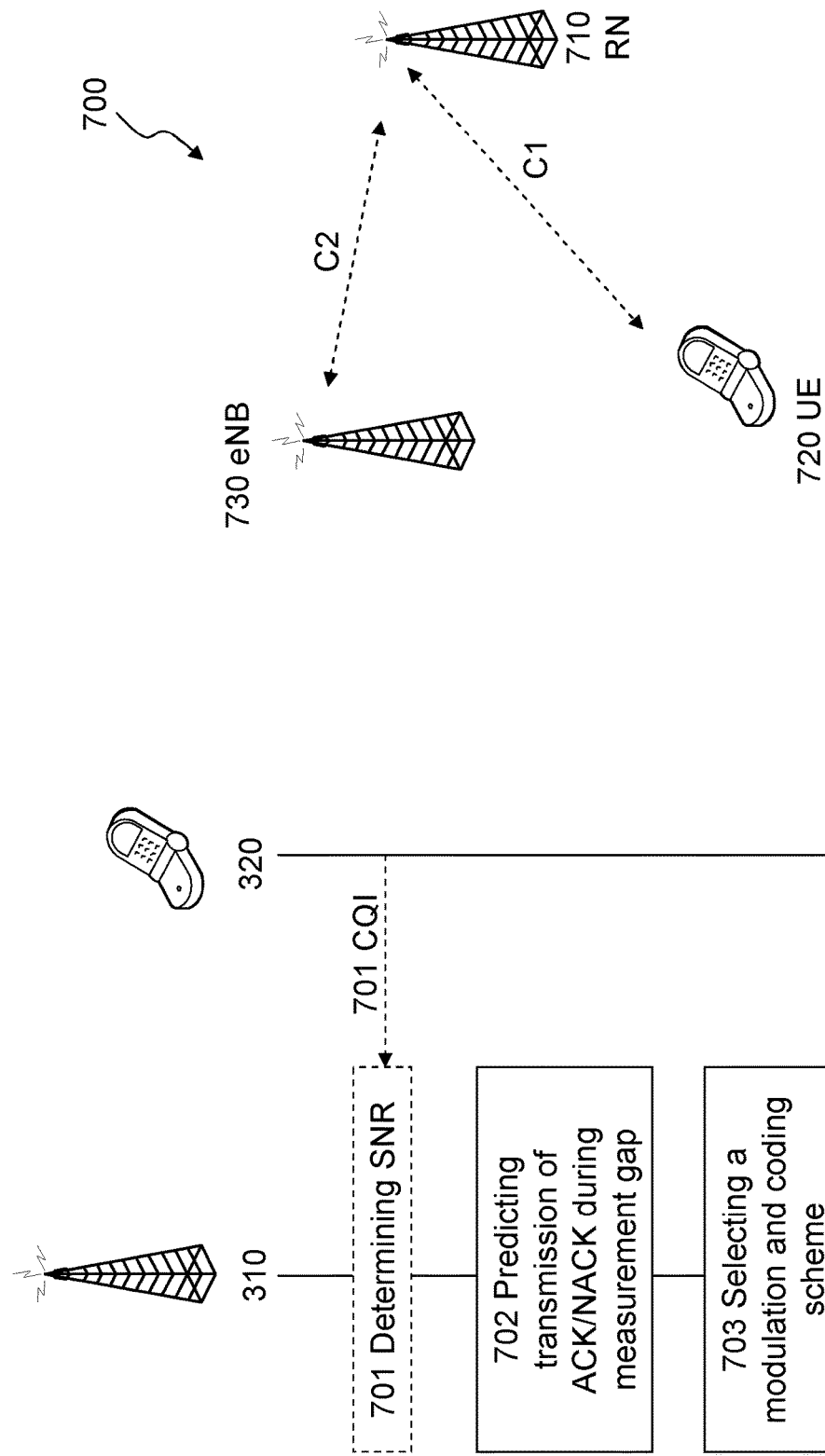
FIG. 7 shows a schematic, combined signalling and flow chart of exemplifying methods in the radio communication system according to FIG. 4.
FIG. 8 shows a schematic overview of a further exemplifying radio communication system.

In FIG. 7, a solution which overcomes the above mentioned problem and drawback is presented. In FIG. 7, an exemplifying method in the eNB 310 for scheduling a data transmission in a first time frame using one of a plurality of modulation and coding schemes is presented. The data transmission is to be transmitted between the eNB 310 and the user equipment 320.

The following actions, such as steps, may be performed according to the method in FIG. 7. Notably, in some embodiments of the method the order of the actions may differ from what is indicated below.

Action 701

This action corresponds to action 301 of the general flowchart in FIG. 3. The eNB 310 may determine, or estimate, SNR as an example of obtaining the first indication for the first time frame, such as a first sub-frame, according to known methods.

Alternatively or additionally, the eNB 310 may receive CQI, or a CQI report, as an example of obtaining the first indication from the user equipment 320 as is known in the art.

As an example, the first time frame may be sub-frame denoted 2 or 3 in FIG. 5. As another example, the first time frame may be one of sub-frames denoted 4, 5, 6 and 7 in FIG. 6.

As an example, this may be applicable when the radio communication system 300 uses Time Division Duplex (TDD) and the channel quality for the uplink is expected to be the same as channel quality for the downlink.

Action 702

This action corresponds to action 302 of the general flowchart in FIG. 3. The eNB 310 predicts that transmission of ACK/NACK, or an ACK/NACK report, occurs during a measurement gap period, as an example of obtaining the second indication. The user equipment 320 is capable of measuring channel quality, such as SINR, SIR, SNR or the like, towards neighbouring radio network nodes during the measurement gap period. Hence, the user equipment 320 is not capable of transmitting or receiving ACK/NACK during the measurement gap period because the second time frame occurs during the measurement gap period. As an example, the second time frame may be sub-frame 6 or 7 of FIG. 5. As another example, the second time frame may be one of sub-frames 8-11 in FIG. 6.

As an example, the second indication may be set, by the eNB 310, to a value less than the channel quality threshold if the eNB 310 predicts that transmission of ACK/NACK occurs during a measurement gap period.

Action 703

This action corresponds to action 303 of the general flowchart in FIG. 3. The eNB 310 selects a modulation and coding scheme based on the SNR and/or the CQI for the first time frame and that ACK/NACK in the second time frame is predicted to occur during the measurement gap period.

For a downlink scenario, the eNB may now assume that the data transmission is properly received by the user equipment 320. Therefore, the eNB does not need to wait for ACK/NACK from the user equipment 320. Also, the user equipment 320 would not be able to transmit the ACK/NACK as shown by the crossed-over dash-dotted arrows of FIG. 4.

For an uplink scenario, the user equipment 320 may now assume that the data transmission is properly received by the eNB 310. Therefore, the user equipment 320 need not wait for ACK/NACK from the eNB 310. Also, the user equipment 320 would not be able to receive the ACK/NACK as shown by the crossed-over dash-dotted arrows of FIG. 5.

Action 704

This action corresponds to action 304 of the general flowchart in FIG. 3. The eNB 310 schedules the data transmission, in the first time frame, using the selected modulation and coding scheme.

Now referring to FIG. 8, where an exemplifying radio communication system 700 is illustrated. The radio communication system 700 is an LTE system. The radio communication system 700 comprises a relay node 710, a user equipment 720 and an eNB 730. The relay node 710 may sometimes be denoted RN. A dashed line C1, provided with an arrow at each end, indicates that the relay node 710 and the user equipment 720 are configured to be able to communicate with each other. Another dashed line C2, provided with an arrow at each end, indicates that the relay node 710 and the eNB 730 are configured to be able to communicate with each other.

A problem that may occur in the radio communication system 700 of FIG. 8 will now be described with reference to FIG. 9.

Figure 9:
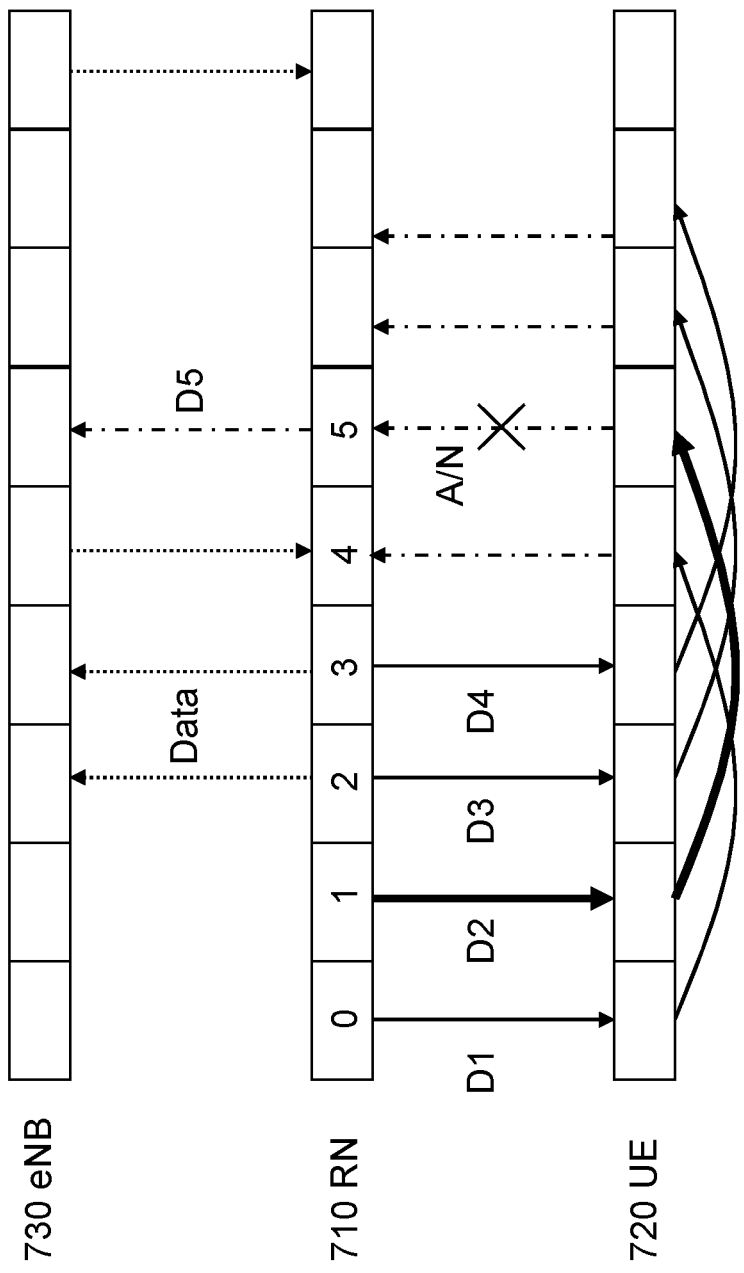
FIG. 9 shows a scenario involving a relay node, shown in FIG. 8, in which scenario feedback information that is unreliable is indicated.

In FIG. 9, a data transmission D1 from the relay node 710 to the user equipment 720 occurs at sub-frame 0, see reference numeral 0. Data transmissions from the eNB 730 to the relay node 710 are shown as dotted arrows, denoted Data. An ACK/NACK, shown as "A/N" in FIG. 9, corresponding to the data transmission D1 at sub-frame 0, is transmitted from the user equipment 720 to the relay node 710 at sub-frame 4, see reference numeral 4. Hence, an ACK/NACK may be successfully transmitted. In this example, a collision between an ACK/NACK corresponding to a second data transmission D2 in sub-frame 1 and a still further transmission D5, which may comprise ACK/NACK or Data, from the relay node 710 to the eNB 730 occurs at sub-frame 5. Therefore, a problem may be that interference from said still further data transmission D5 makes it difficult, if not impossible, for the relay node 710 to receive and correctly decode the ACK/NACK of sub-frame 5. See dash-dotted arrow, which has been crossed over at sub-frame 5.

Figure 10:
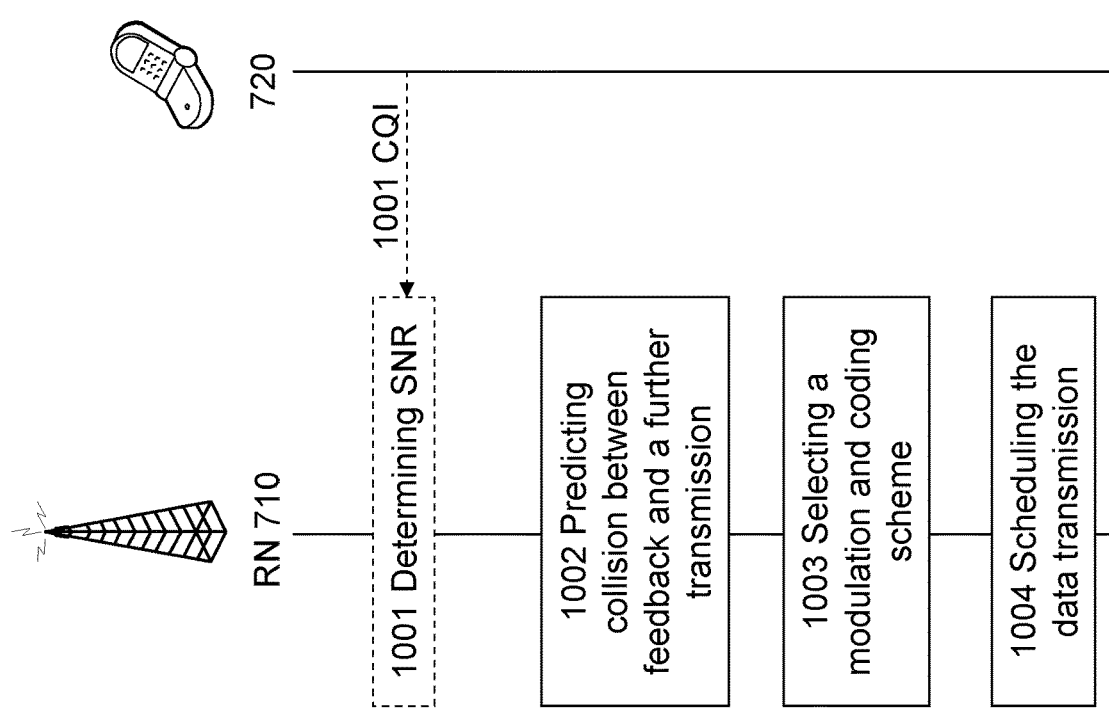
FIG. 10 shows a schematic, combined signalling and flow chart of exemplifying methods in the radio communication system according to FIG. 8.

In FIG. 10, a solution is presented which overcomes the above mentioned problem, which has been explained with reference to FIG. 9. In FIG. 10, an exemplifying method in the relay node 710 is presented for scheduling a data transmission in a first time frame using one of a plurality of modulation and coding schemes. The data transmission is between the relay node 710 and the user equipment 720.

The following actions, such as steps, may be performed according to the method in FIG. 10. Notably, in some embodiments of the method the order of the actions may differ from what is indicated below.

Action 1001

This action corresponds to action 301 of the general flowchart in FIG. 3.

The relay node 710 may determine SNR for the first time frame according to known methods. As an example, the first time frame may be sub-frame 1 of FIG. 9.

Alternatively or additionally, the relay node 710 may receive CQI, or a CQI report, from the user equipment 720 as is known in the art.

Action 1002

This action corresponds to action 302 of the general flowchart in FIG. 3.

The relay node 710 predicts that transmission of ACK/NACK occurs during a further transmission, as an example of obtaining the second indication. Said further transmission is a transmission from the relay node 710 to the eNB 730. See arrow C3 in FIG. 7. The eNB 730 is an example of the third radio communication node. Said further transmission may be a transmission of data or ACK/NACK. Hence, ACK/NACK from the user equipment 720 to the relay node 710 can not be properly received and decoded by the relay node 720. Hence, the further transmission occurs during the second time frame. As an example, the second time frame may be sub-frame 5 of FIG. 9.

In some examples, the relay node 710 obtains the second indication by setting the second indication to a value less than the channel quality threshold when the relay node 710 predicts that transmission of ACK/NACK occurs during a further transmission.

Action 1003

This action corresponds to action 303 of the general flowchart in FIG. 3.

The relay node 710 selects a modulation and coding scheme based on the SNR and/or the CQI for the first time frame and based on the prediction of ACK/NACK during the further transmission in the second time frame.

A downlink scenario may be represented by a data transmission from the relay node 710 to the user equipment 720, see D1 to D4 in FIG. 9. For the downlink scenario, the relay node 710 may now assume that the data transmission is properly received by the user equipment 720. Therefore, the relay node 710 need not wait for ACK/NACK, shown as dash-dotted arrows A/N, from the user equipment 720, in sub-frame 5 of FIG. 9. Also, the relay node 710 would not be able to receive and correctly decode the ACK/NACK as shown by the crossed over dash-dotted arrow of FIG. 9. The relay node 710 would not be able to decode the ACK/NACK from the user equipment 720 due to interference from said further transmission D5 of FIG. 9.

Action 1004

This action corresponds to action 304 of the general flowchart in FIG. 3.

The relay node 710 schedules the data transmission, in the first time frame, using the selected modulation and coding scheme.

For the third exemplifying scenario, a radio communication system 1000 is illustrated with reference to FIG. 11. The radio communication system 1000 may be a Bluetooth radio communication system. The radio communication system 1000 comprises a user equipment 1010 and a headset 1020. A dashed-line E1, provided with an arrow at each end, indicates that the user equipment and the headset 1020 are configured to be able to communicate with each other. Likewise, a dashed-line E2, provided with an arrow at each end, indicates that an eNB 1030 and the user equipment 1010 are configured to be able to communicate with each other. Notably, the eNB and the user equipment are comprised in a cellular radio communication system 1040, such as an LTE system. Here, the eNB is the third radio communication node.

Figure 11:
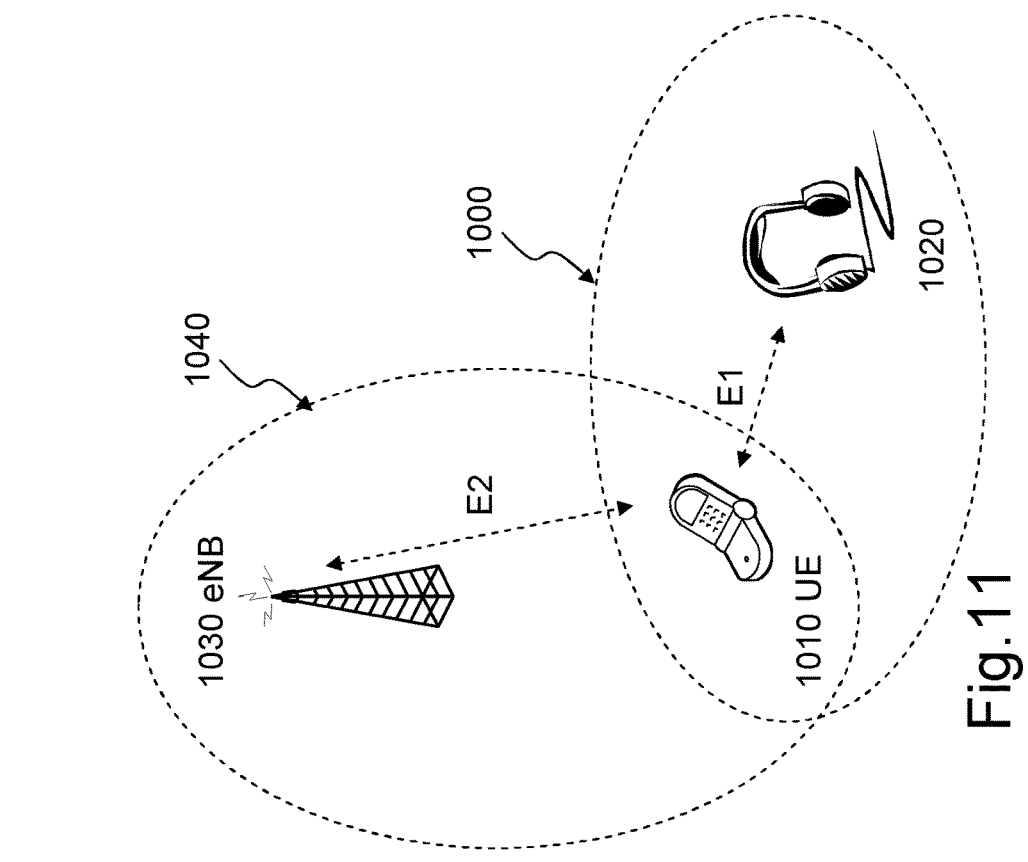
FIG. 11 shows a schematic overview of yet another exemplifying radio communication system.

In conjunction with FIG. 11, the headset 1020 is mentioned as an example of the second radio communication node 120. In other examples, the second radio communication node 120 may be a radio communication device equipped with functionality for communication over Bluetooth, WLAN or the like. The radio communication device may be a printer, a router, a headset, a media server, a file server or the like.

For the user equipment 1010 in FIG. 11, the same or similar problem that was explained in relation to the relay node may occur. In this respect, the user equipment 1010 in FIG. 11 corresponds to the relay node 710 in FIGS. 8 and 9. The problem occurring in the radio communication system 1000 of FIG. 11 will next be elaborated with reference to FIGS. 12 and 13.

Figure 12:
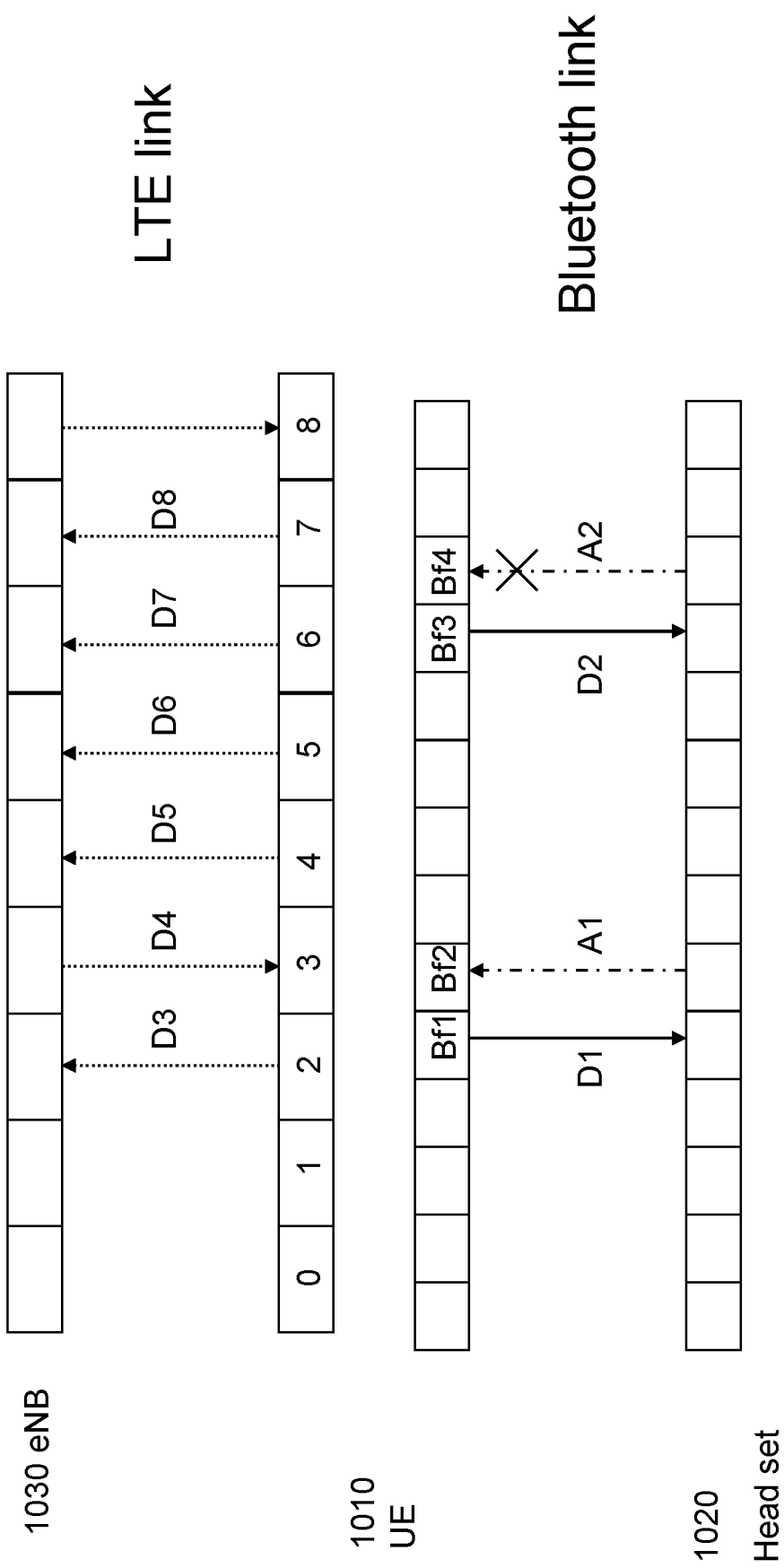
FIG. 12 shows a scenario involving a user equipment, shown in FIG. 11, in which scenario feedback information received from the headset is unreliable.

Referring to FIG. 12, a number of sub-frames for a communication between the user equipment 1010 and the headset 1020 is shown. In this scenario, attention is directed towards arrows indicated D1-D2, and A1-A2 and arrow D8. It may be noted that the sub-frame structure of LTE differs from the sub-frame structure of Bluetooth as shown by boxes Bf1-Bf4, which have a shorter length than the sub-frames 0-8. Only a few reference numerals Bf has been indicated such as to keep FIG. 12 simple.

In Bluetooth (BT), each of the data transmissions D1-D2 is followed by a corresponding ACK/NACK, shown as A1-A2. For the ACK/NACK A2 in sub-frame Bf4, there may be difficulties for the user equipment 1010 in receiving and decoding of the ACK/NACK due to a further transmission, denoted D8, towards the eNB 1030. Also, the transmission indicated by D7 makes it difficult for the user equipment 1010 to receive and decode the ACK/NACK. A problem may be that performance may degrade due to the collision between the further data transmission D8, and to some extent transmission indicated by D7, and the ACK/NACK transmission A2.

Figure 13:
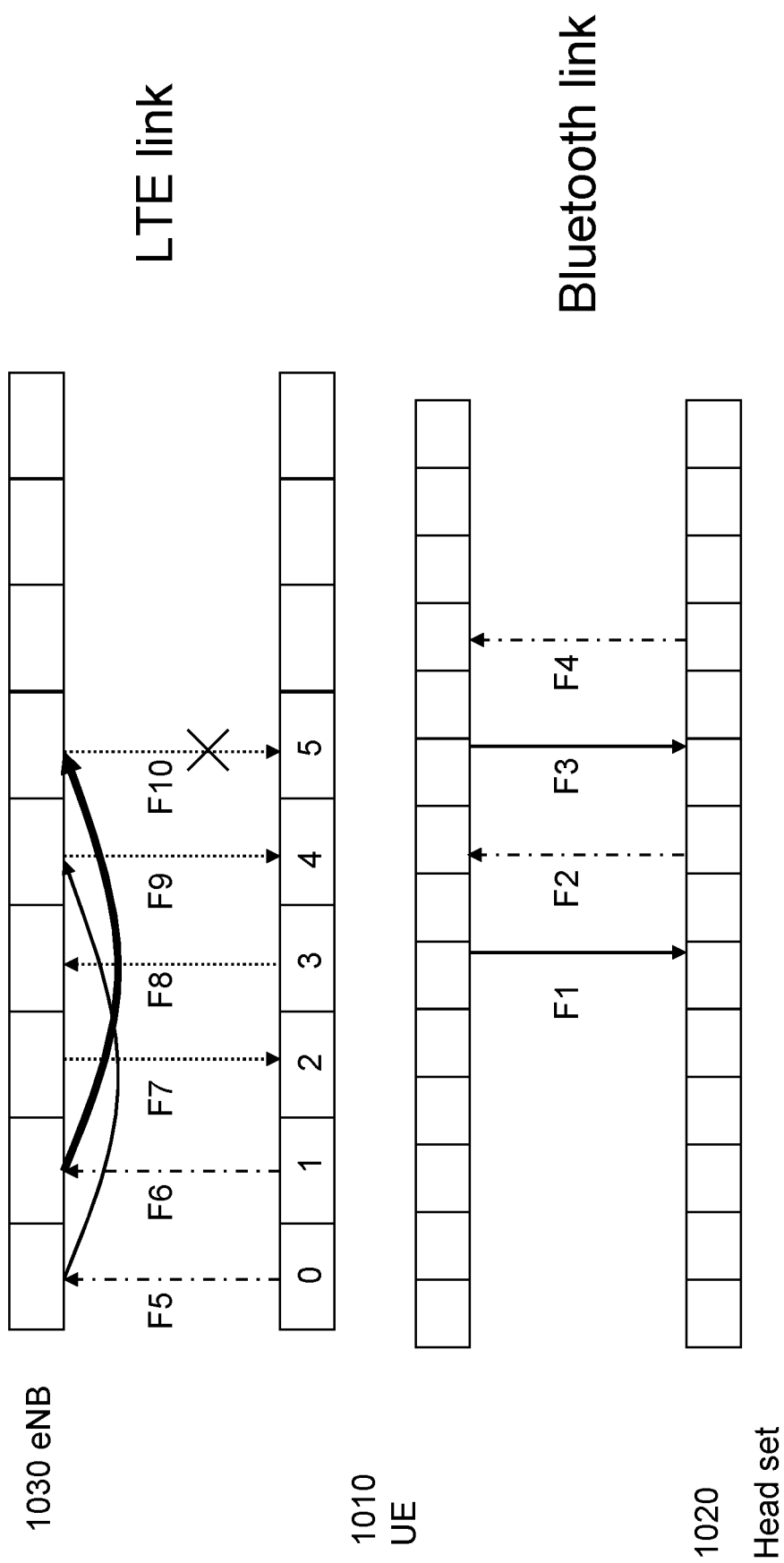
FIG. 13 shows a scenario involving a user equipment, shown in FIG. 11, in which scenario feedback information received from the eNB set is unreliable.

Now instead turning to FIG. 13, in which attention is directed towards arrow F3 and arrows F5-F10. For data transmission F6 in sub-frame 1, there will be a corresponding ACK/NACK, shown as F10, in sub-frame 5. In this example, the transmission F10 of the ACK/NACK in sub-frame 5 collides with a further data transmission F3. Again, a problem may be that performance may degrade due to collision between the further data transmission F3 and the transmission F10 of the ACK/NACK.

Therefore, as will be explained with reference to FIG. 14, the Bluetooth link communication may be adapted such that no ACK/NACK is required when there is a collision or the LTE communication may be adapted such that no ACK/NACK is required when there is a collision.

Figure 14:
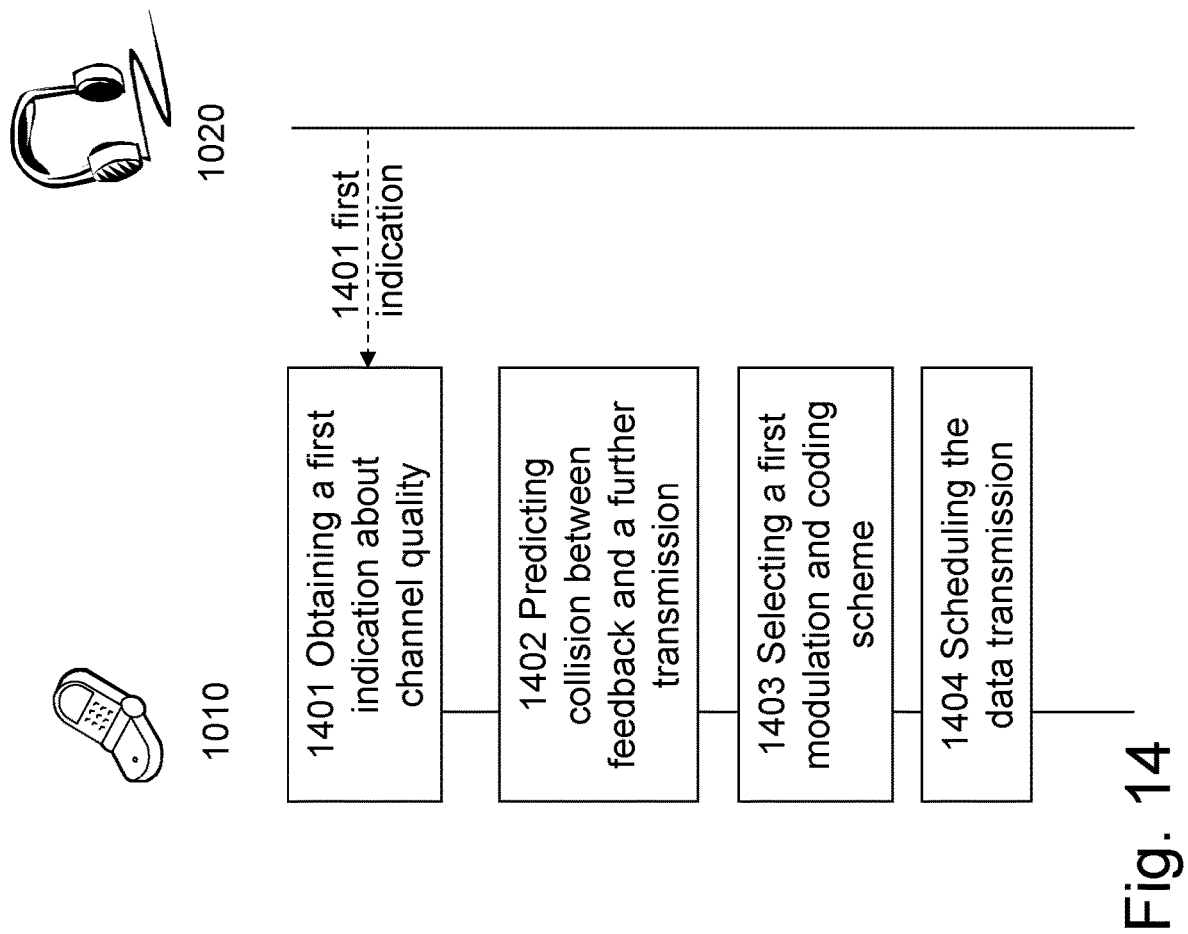
FIG. 14 shows a schematic, combined signalling and flow chart of exemplifying methods in the radio communication system according to FIG. 11.

In FIG. 14, there is presented a solution which may overcome the above mentioned problems, which have been explained with reference to FIGS. 12 and 13 directly above.

In FIG. 14, there is hence presented exemplifying methods in the user equipment 1010 for scheduling a data transmission in a first time frame using one of a plurality of modulation and coding schemes. The data transmission is to be transmitted between the user equipment 1010 and the headset 1020, i.e. this may be an uplink or a downlink transmission with respect to the user equipment 1010. A Bluetooth link is established between the user equipment 1010 and the headset 1020.

The following actions, such as steps, may be performed. Notably, in some embodiments of the method the order of the actions may differ from what is indicated below.

Action 1401

This action corresponds to action 301. As an example, the first time frame may be sub-frame 4 of FIG. 12 or sub-frame 1 FIG. 13.

The user equipment 1010 determines the quality of the Bluetooth link for the first time frame according to known methods. One example of how this link quality can be determined is by having the headset reporting the received signal power, or, in case power control is used, simply estimate the link quality based on the requested transmit power. This applies to when the Bluetooth communication is adapted.

Alternatively or additionally, the user equipment 1010 receives Received Signal Strength Indication (RSSI) from the headset 1020 as is known in the art. This applies to when the Bluetooth communication is adapted.

The user equipment 1010 determines SNR for the first time frame according to known methods. This applies to when the LTE communication is adapted.

Action 1402

This action corresponds to action 302 of the general flowchart in FIG. 3.

The user equipment 1010 predicts that transmission of ACK/NACK occurs during a further transmission, see reference numeral D7 of FIG. 12. Said further transmission is a transmission from the user equipment 1010 to the eNB 1030. Said further transmission may be a transmission of data or ACK/NACK. Hence, ACK/NACK from the headset 1020 to the user equipment 1010 can not be properly received and decoded by the user equipment 1010, see reference numeral A3 of FIG. 12.

In some examples, the user equipment 1010 obtains the second indication by setting the second indication to a value less than the channel quality threshold when the user equipment 1010 predicts that transmission of ACK/NACK occurs during a further transmission. This applies to when the Bluetooth communication is adapted.

The user equipment 1010 predicts that transmission of ACK/NACK occurs during a further transmission, see reference numeral F3 of FIG. 13. Said further transmission is a transmission from the user equipment 1010 to the headset 1020. Said further transmission may be a transmission of data or ACK/NACK. Hence, ACK/NACK from the eNB 1030 to the user equipment 1010 can not be properly received and decoded by the user equipment 1010, see reference numeral F10 of FIG. 13. This applies to when the LTE communication is adapted.

In these actions, it is detected that the further transmission, D7 or F3, occurs during the second time frame. As an example, the second time frame may be sub-frame 5 of FIG. 12 or 13.

Action 1403

This action corresponds to action 303 of the general flow chart of FIG. 3.

The user equipment 1010 selects a MCS that is more robust than another modulation and coding scheme which the user equipment 1010 would have selected based on for example the RSSI received in action 1001. Alternatively, the user equipment 1010 selects a transmit power that is higher than would have been selected based on for example the RSSI received in action 1001. This applies to when the Bluetooth communication is adapted.

For the downlink scenario in FIG. 12, the user equipment 1010 may now assume that the data transmission D3 is properly transmitted and received by the headset 1020. Therefore, the user equipment 1010 need not wait for ACK/NACK A3, shown as dash-dotted arrows A/N, from the headset 1020. Also, the user equipment 1010 would not be able to receive and correctly decode the ACK/NACK A3 as shown by the dash-dotted arrow of FIG. 12, which dash-dotted arrow has been crossed over. The user equipment 1010 would not be able to decode the ACK/NACK A3 from the headset 1020 due to interference from said further transmission D7 of FIG. 12. Said further transmission is denoted D7. This also applies to when the Bluetooth communication is adapted.

The user equipment 1010 selects a modulation and coding scheme that is more robust than another modulation and coding scheme which the user equipment 1010 would have selected based on for example the SNR determined in action 1010. This applies to when the LTE communication is adapted. Alternatively, in case the eNB is aware if the interference situation, the modulation and coding scheme is selected by the eNB rather than the UE, but the resulting effect will be the same.

Action 1404

This action corresponds to action 304 of the general flow chart of FIG. 3.

The user equipment 1010 schedules the data transmission using the selected modulation and coding scheme and/or transmit power. This applies to when the Bluetooth communication is adapted.

The user equipment 1010 uses the selected modulation and coding scheme for the data transmission in the first time frame. This applies to when the LTE communication is adapted.

Another example corresponding to the coexistence scenario is when a user equipment is used as a router, so that the data is routed from the cellular network, using for instance LTE, via the user equipment to a laptop, and where the link from the user equipment to the laptop uses WiFi, for instance WLAN 802.11g. In this case the two links are using different standards and because the frequency band used for LTE (for instance 2300-2400 MHz) might be very close to the frequency band used by WLAN (for instance channel 1, with center frequency at 2412 MHz). Considering the user equipment transmitting data to the laptop, which has to be acknowledged, it is readily seen that this ACK/NACK report from the laptop might be unreliable because the user equipment at the same time is scheduled to transmit to the eNB. If this is the case, i.e., the ACK/NACK report will be unreliable, the user equipment might choose a more robust modulation and coding scheme in the transmission to the laptop.

In a similar fashion, in case it would be beneficial to allow a more flexible operation of the DL from the user equipment to the laptop, the need to receive an ACK/NACK report from the eNB can be avoided by using a more robust modulation and coding scheme in the UL from the user equipment to the eNB With reference to the first, second and third exemplifying methods above, it may be noted that for a given data transmission positive feedback information response, such as ACK, may rightfully be assumed, since the modulation and coding scheme is selected such that the data transmission may be assumed to be reliably received. Therefore, no retransmission due to not receiving feedback information response occurs. As a result, performance, in particular transmission rate, or data rate, of the cellular radio communication system is improved as compared to prior art.

Figure 15:
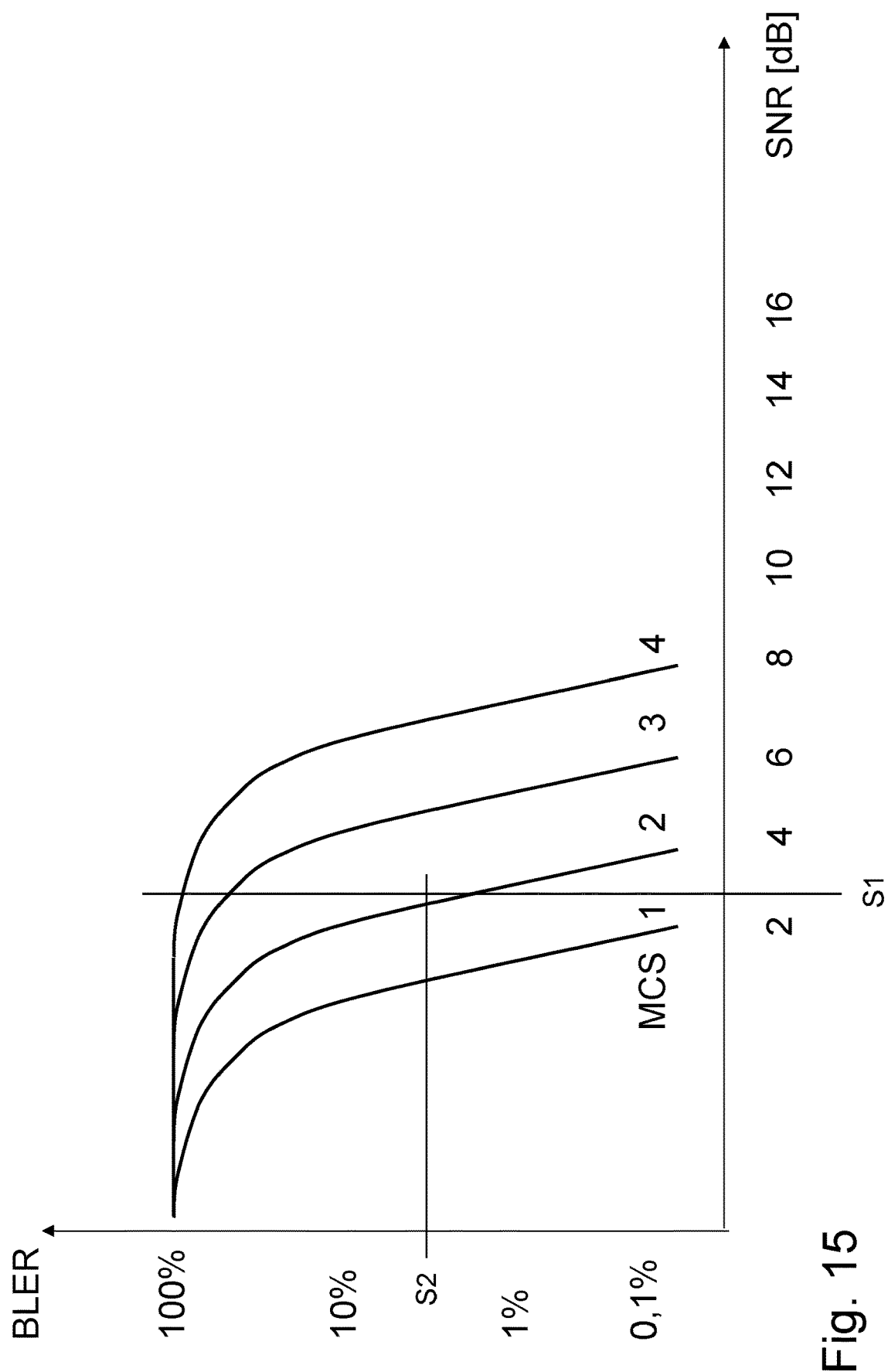
FIG. 15 shows block-error-rate as a function of signal-to-noise-ratio for different modulation and coding schemes.

In order to facilitate understanding of the selection of the modulation and coding scheme when the feedback information is expected to be unreliable due to a possible upcoming transmission failure, FIG. 15 shows a diagram in which block-error-rate is plotted as a function of signal-to-noise-ratio (SNR) for a plurality of modulation and coding schemes MCS 1-4. From the Figure, it may be seen that for a given SNR, shown as S1, and a given BLER, shown as S2, some modulation and coding schemes may be excluded, e.g. MCS 3 and 4 according the example shown in the Figure. These modulation and coding scheme, i.e. MCS 3 and 4, are excluded because at the given SNR, indicated by S1, the BLER would exceed the given BLER, indicated by S2. As an example, the modulation and coding schemes MCS 1-4 may be associated to values 1 through 4, respectively.

In some embodiments of the methods, a more robust modulation and coding scheme may be selected by (1), in a first step, determining a modulation and coding scheme based on only the first indication, and (2), in a second step, selecting the more robust modulation and coding scheme to be the modulation and coding scheme that corresponds to a value being one step, or unit, less than the value associated to the modulation and coding scheme determined in the first step (1). This may be preferred for a channel with flat fading and large dispersion. For a channel with low dispersion and slow fading, the more robust modulation and coding scheme may be selected to be the modulation and coding scheme that corresponds to a value being up to three steps, or units, less than the value associated to the modulation and coding scheme determined in the first step (1).

For the first, second and third exemplifying methods described above in conjunction with FIGS. 7, 10 and 14, the following further embodiments may be contemplated.

In some embodiments of the methods, the modulation and coding scheme is selected such that at most a specific block-error-rate (BLER) S2 is obtained for the data transmission. The specific BLER is an example of the first BLER. Thereby, allowing ACK to be assumed.

In some embodiments of the methods, the specific BLER is less than 0.5%, preferably less than 0.1%. When the specific BLER is at these percentage values, a reasonable error rate, which may be handled by higher layers, may be obtained. Moreover, with the specific BLER as above an acceptable performance and/or throughput is obtained as well. It may be noted that in order to not make a muddled Figure, the reference numeral S2 has been put at about 2%, but more realistic values are 0.5% or less as mentioned above in this paragraph.

The feedback information may be unreliable in that the transmission thereof is predicted to occur during a measurement gap period. In this case, the SNR may be said to be equal to zero in linear scale, because the signal is zero. FIG. 15 is in dB scale where zero in linear scale corresponds to infinity.

In other scenarios, such as the second and third exemplifying methods mentioned above, the feedback information may be unreliable in that the SNR, as an example of the second indication, is below the channel quality threshold value. The SNR may be low due to self interference in case of the $2^{nd}$ scenario and the SNR may be low due to interference from other radio communication technologies in case of the $3^{rd}$ scenario. Given the low SNR and the modulation and coding scheme for the transmission of the feedback response information, a resulting BLER may be calculated.

As an example, the feedback information may be considered to be unreliable when the error probability for the ACK/NACK is 30% or higher. Then, a more robust modulation and coding scheme is selected for the transmission of the data transmission, corresponding to the feedback information, such that the data transmission may be assumed to be correctly transmitted and received. Thereby, the transmission of the feedback information is rendered unnecessary.

Figure 16:
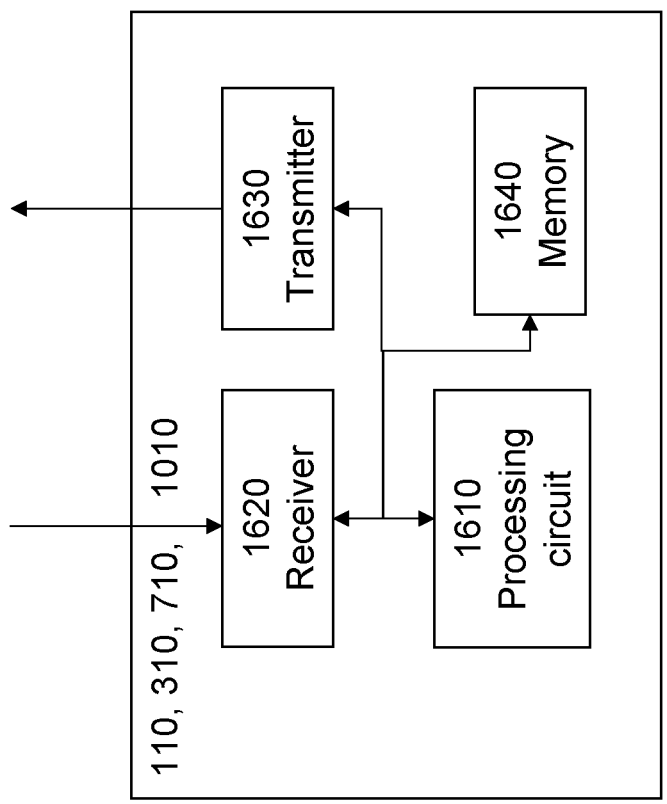
FIG. 16 shows a schematic block diagram of an exemplifying radio communication node configured to perform the methods illustrated in FIGS. 3, 7, 10 and 14.

With reference to FIG. 16, there is shown a schematic block diagram of the first radio communication node 110, 310, 710, 1010 configured to perform the actions according to the exemplifying methods above. The first radio communication node 110, 310, 710, 1010 may be configured to perform a method for scheduling a data transmission in a first time frame using one of a plurality of modulation and coding schemes. The data transmission is to be transmitted between the first radio communication node 110, 310, 710, 1010 and a second radio communication node 120, 320, 720, 1020. The first and second radio communication nodes 110, 310, 710, 1010, 120, 320, 720, 1020 are configured for being comprised in a radio communication system 100, 300, 700, 1000.

The first radio communication node 110, 310, 710, 1010 comprises a processing circuit 1610 configured to obtain a first indication about channel quality for the first time frame. The processing circuit 1610 is further configured to obtain a second indication about a possible upcoming transmission failure. The possible upcoming transmission failure relates to a feedback information to be transmitted in a second time frame. The feedback information is associated with the data transmission in the first time frame. Moreover, the processing circuit 1610 is configured to select a modulation and coding scheme out of said plurality of modulation and coding schemes based on the first indication for the first time frame and the second indication for the second time frame. In addition, the processing circuit is configured to schedule, in the first time frame, the data transmission using the modulation and coding scheme.

In some embodiments, a first block-error-rate, BLER, is smaller than a second block-error-rate, BLER. The processing circuit (1610) may be configured to select, if the second indication is below a channel quality threshold value, the modulation and coding scheme to target the first BLER for the data transmission, or to select, if the second indication is above the channel quality threshold value, the modulation and coding scheme to target the second BLER for the data transmission.

The processing circuit 1610 may further be configured to predict when the second time frame for transmission of the feedback information occurs during a measurement gap period. The user equipment 110, 310, 710, is capable of measuring channel quality towards neighbouring radio network nodes during the measurement gap period. The neighbouring radio network nodes are neighbours to the first radio communication node 110. The processing circuit 1610 may further be configured perform the selection of the modulation and coding scheme when the transmission of the feedback information occurs during the measurement gap period.

The processing circuit 1610 may further be configured to predict that the second time frame for transmission of the feedback information occurs during transmission of a further data transmission to a third radio communication node 730, 1030. Moreover, the processing circuit 1610 may further be configured to perform the selection of the modulation and coding scheme when the transmission of the feedback information is predicted to occur during the transmission of the further data transmission.

In some embodiments, the second radio communication node 120, 320, 720, 1020 is a user equipment 320, 720. The first radio communication node 110, 310, 710, 1010 may comprise a receiver 1620 configured to receive the first indication from the user equipment 320, 720. The first indication comprises a channel quality index, CQI, information, or a signal-to-interference-ratio, SIR, information.

In some embodiments, the first radio communication node may further comprise a transmitter 1620. As appropriate according to embodiment herein, the transmitter may be configured to send the data transmission as scheduled by the processing circuit 1610.

In some embodiments, the first radio communication node may further comprise a memory 1640 for storing software to be executed by, for example, the processing circuit. The software may comprise instructions to enable the processing circuit to perform the method in the first radio communication node 110 as described above in conjunction with FIGS. 3, 7, 10 and 14. The memory 1640 may be a hard disk, a magnetic storage medium, a portable computer diskette or disc, flash memory, random access memory (RAM) or the like. Furthermore, the memory may be an internal register memory of a processor.

In some embodiments, the first radio communication node 110 is an evolved-NodeB 110.

In some embodiments, the first radio communication node 110, 310, 710, 1010 is a relay node 710, the second radio communication node 120, 320, 720, 1020 is a user equipment 720, the third radio communication node 730, 1030 is a radio network node 730 comprised in the radio communication system 700. The user equipment 720 is configured to send the feedback information.

In some embodiments, the first radio communication node 110, 310, 710, 1010 is a user equipment 1010, wherein the third radio communication node 730, 1030 is a radio network node 1030, wherein the second radio communication node 120, 1020 is configured to send the feedback information, and wherein the third radio communication node 1030 is configured for communicating with the user equipment 1010 using a different radio communication technology than the radio communication technology used by the radio communication system 1000.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a first radio communication node for scheduling a data transmission in a first time frame, using one of a plurality of modulation and coding schemes, wherein the data transmission is to be transmitted between the first radio communication node and a second radio communication node, wherein the first radio communication node and the second radio communication node are comprised in a radio communication system, the method comprising:

obtaining a first indication about channel quality for the first time frame;

obtaining a second indication that reception of feedback information in an upcoming second time frame is likely to be unreliable, wherein the feedback information is associated with the data transmission in the first time frame and the second time frame is after the first time frame;

selecting a modulation and coding scheme out of said plurality of modulation and coding schemes, based on the first indication and the second indication; and scheduling the data transmission in the first time frame using the selected modulation and coding scheme.

2. The method of claim 1, wherein the second radio communication node is a user equipment, and wherein the obtaining of the first indication about channel quality comprises receiving the first indication from the user equipment, wherein the first indication comprises a channel quality index (CQI) information or signal-to-interference-ratio (SIR) information.

3. The method of claim 1, wherein the obtaining of the second indication is performed by:

predicting that the upcoming second time frame occurs during transmission of a further data transmission to a third radio communication node, and wherein the action of selecting the modulation and coding scheme is performed when the reception of the feedback information is predicted to occur during the transmission of the further data transmission.

4. The method of claim 3, wherein the first radio communication node is a relay node, the second radio communication node is a user equipment, the third radio communication node is a radio network node comprised in the radio communication system, and the feedback information is to be transmitted by the user equipment.

5. The method of claim 3, wherein the first radio communication node is a user equipment, wherein the third radio communication node is a radio network node, wherein the feedback information is to be sent by the second radio communication node, and wherein the third radio communication node is capable of communicating with the user equipment using a different radio communication technology than the radio communication technology used by the radio communication system.

6. The method of claim 1, wherein a first block-error-rate (BLER) is smaller than a second block-error-rate (BLER) and wherein the selecting comprises:
selecting, if the second indication is below a channel quality threshold value, the modulation and coding scheme to target the first BLER for the data transmission, or
selecting, if the second indication is above the channel quality threshold value, the modulation and coding scheme to target the second BLER for the data transmission.

7. The method of claim 1, wherein the obtaining of the second indication is performed by:
predicting that the upcoming second time frame occurs during a measurement gap period, wherein the second radio communication node is capable of measuring channel quality towards neighboring radio network nodes during the measurement gap period, wherein the neighboring radio network nodes are neighbors to the first radio communication node; and wherein the selecting the modulation and coding scheme is performed when the reception of the feedback information is predicted to occur during the measurement gap period.

8. The method of claim 1, wherein the obtaining of the second indication is performed by:
predicting that the upcoming second time frame for transmission of the feedback information occurs during transmission of a further data transmission to a third radio communication node, and wherein the action of selecting the modulation and coding scheme is performed when the reception of the feedback information is predicted to occur during the transmission of the further data transmission.

9. The method of claim 8, wherein the first radio communication node is a relay node, the second radio communication node is a user equipment, the third radio communication node is a radio network node comprised in the radio communication system, and the feedback information is to be transmitted by the user equipment.

10. The method of claim 8, wherein the first radio communication node is a user equipment, wherein the third radio communication node is a radio network node, wherein the feedback information is to be sent by the second radio communication node, and wherein the third radio communication node is capable of communicating with the user equipment using a different radio communication technology than the radio communication technology used by the radio communication system.

11. A first radio communication node for scheduling a data transmission in a first time frame using one of a plurality of modulation and coding schemes, wherein the data transmission is to be transmitted between the first radio communication node and a second radio communication node, wherein the first and second radio communication nodes are comprised in a radio communication system, and wherein the first radio communication node comprises a processing circuit configured to:
obtain a first indication about channel quality for the first time frame;
obtain a second indication that reception of feedback information in an upcoming second time frame is likely to be unreliable, wherein the feedback is associated with the data transmission in the first time frame and the second time frame is after the first time frame;
select a modulation and coding scheme out of said plurality of modulation and coding schemes based on the first indication and the second indication; and
schedule the data transmission in the first time frame using the modulation and coding scheme.

12. The first radio communication node of claim 11, wherein the second radio communication node is a user equipment, wherein the first radio communication node comprises a receiver configured to receive the first indication from the user equipment, and wherein the first indication comprises a channel quality index (CQI) information, or a signal-to-interference-ratio (SIR) information.

13. The first radio communication node of claim 11, wherein a first block-error-rate (BLER) is smaller than a second block-error-rate (BLER) and wherein the processing circuit is configured to:
select, if the second indication is below a channel quality threshold value, the modulation and coding scheme to target the first BLER for the data transmission; or
select, if the second indication is above the channel quality threshold value, the modulation and coding scheme to target the second BLER for the data transmission.

14. The first radio communication node of claim 12, wherein the processing circuit further is configured to predict when the upcoming second time frame occurs during a measurement gap period, wherein the user equipment is capable of measuring channel quality towards neighboring radio network nodes during the measurement gap period, wherein the neighboring radio network nodes are neighbors to the first radio communication node; and to perform the selection of the modulation and coding scheme when the reception of the feedback information occurs during the measurement gap period.

15. The first radio communication node of claim 11, wherein the processing circuit further is configured to predict that the upcoming second time frame occurs during transmission of a further data transmission to a third radio communication node; and to perform the selection of the modulation and coding scheme when the reception of the feedback information is predicted to occur during the transmission of the further data transmission.

16. The first radio communication node of claim 15, wherein the first radio communication node is a relay node, the second radio communication node is a user equipment, the third radio communication node is a radio network node comprised in the radio communication system, and the user equipment is configured to send the feedback information.

17. The first radio communication node of claim 15, wherein the first radio communication node is a user equipment, wherein the third radio communication node is a radio network node, wherein the second radio communication node is configured to send the feedback information, and wherein the third radio communication node is configured for communicating with the user equipment using a different radio communication technology than the radio communication technology used by the radio communication system.

* * * * *